(12) United States Patent
Zhou

(10) Patent No.: US 7,924,111 B2
(45) Date of Patent: Apr. 12, 2011

(54) METHOD AND DEVICE FOR TRANSFERRING SINGLE-ENDED SIGNAL WITH INTERFERENCE-RESISTANCE

(76) Inventor: Zongshan Zhou, Dongguan (CN)

( * ) Notice: Subject to any disclaimer, the term of this patent is extended or adjusted under 35 U.S.C. 154(b) by 693 days.

(21) Appl. No.: 11/912,142

(22) PCT Filed: Apr. 18, 2006

(86) PCT No.: PCT/CN2006/000712
§ 371 (c)(1),
(2), (4) Date: Oct. 20, 2007

(87) PCT Pub. No.: WO2006/111080
PCT Pub. Date: Oct. 26, 2006

(65) Prior Publication Data
US 2008/0171521 A1    Jul. 17, 2008

(30) Foreign Application Priority Data

Apr. 20, 2005  (CN) .......................... 2005 1 0034186
Jul. 26, 2005  (CN) .......................... 2005 1 0085682

(51) Int. Cl.
*H04B 3/28* (2006.01)
(52) U.S. Cl. ........................................ 333/12
(58) Field of Classification Search ...................... 333/12
See application file for complete search history.

(56) References Cited

U.S. PATENT DOCUMENTS

| 1,921,022 | A | * | 8/1933 | Burton | ................. | 178/63 R |
| 3,252,093 | A | * | 5/1966 | Lerner | ................. | 375/296 |
| 3,441,869 | A | * | 4/1969 | Thompson | ................. | 330/199 |
| 6,809,609 | B1 | * | 10/2004 | Shibata et al. | ................. | 333/12 |

* cited by examiner

*Primary Examiner* — Robert Pascal
*Assistant Examiner* — Alan Wong

(57) ABSTRACT

The invention provides a method of transferring single ended signal with interference-resistance. The transmission of the single ended signal includes an input device and an output device. The output device has its signal output terminal connected with a signal input terminal of the input device. A signal floating isolation circuit is connected with the signal output terminal of the output device and/or signal input terminal of the input device. The output signal or input signal is output or input via this floating isolation circuit. The isolation reference terminal of the output signal is coupled to ground of the output device through the isolation impedance, and/or the isolation reference terminal of the input signal is coupled to the ground of the input device. The signal output reference terminal of the output device and the signal input reference terminal of the input device are connected with each other. The invention also provides an input device and an output device both of which are used to transfer single ended signal with interference-resistance. By improving interface circuit design between the signals receiving side and transmitting side, interference signal entered into the signal channels are reduced, and the cost of implementation of the invention are also low.

5 Claims, 2 Drawing Sheets

METHOD AND DEVICE FOR TRANSFERRING SINGLE-ENDED SIGNAL WITH INTERFERENCE-RESISTANCE

FIELD OF THE INVENTION

The invention relates to a method for transferring signal and more particularly, relates to a method for transferring single ended signal with interference-resistance and a device used for inputting and outputting single ended signal with interference-resistance.

BACKGROUND OF THE INVENTION

Single ended signal is a commonly used signal form due to its simple processing circuitry. This signal however, is susceptible to interference during transferring process and consequently, where signal transmission system needs rigid requirement for anti-interference, differential signal transmission is normally employed. However, utilization of differential signal system increases complexity of hardware and results in limited application range. Thus, it is desired to provide a method of single ended signal transferring with interference-resistance.

Single ended signal may be easily influenced by interference during transmission. Due to lack of knowledge about reasons of occurrence of interference, it is high costly for normal method of reducing interference. Method for decreasing interference currently used is reducing interference source, as well as impedance of the connections at reference terminal as soon as possible. Thus, it is desired to provide an improved method of signal transferring capable of resisting high interference.

The follow is analysis of generation of interference.

FIG. 1 is an equivalent circuit of a single ended signal transferring circuit, wherein G: reference ground Goe: signal output device ground Gie: signal input device ground Vs: voltage source of output signal Rs: internal resistance of output signal Ri: internal resistance of signal input side Cs: the sum of body capacitance and capacitance of induced capacitor of the signal output device ground relative to the reference ground G Vns: induced interference voltage of the signal output device ground relative to the reference ground G Ci: the sum of body capacitance and capacitance of induced capacitor of the signal input device ground relative to the reference ground G Vni: induced interference voltage of the signal input device ground relative to the reference ground G Rr: impedance of wiring between the reference terminal of signal input and output side Vnl: induced interference voltage on the wiring between the reference terminal of signal input and output side Vnr: interference voltage resulted from interference current generated at Rr by all the interference source existing in a system Vn: the sum of Vnl and Vnr, i.e., equivalent interference voltage at the signal input side The single ended signal has a signal terminal and a reference terminal, the later being commonly referred as a signal ground. The reference terminal has its potential constant, whereas potential at the signal terminal varies. It can be considered that interference mostly coming from wiring of the reference terminal and interference coming from the signal terminal is very little during transmission of the single ended signal. The interference voltage results from the following three sources: the first source is induced interference voltage at wiring between the reference terminal of receiving side and transmitting side, whose equivalent voltage to input signal is represented by Vnl in the figure; the second source is potential difference at the impedance Rr of wiring of the reference terminal, the potential difference resulting from interference current generated by unbalanced inducing voltage between the reference terminal of receiving and transmitting sides, the equivalent interference voltage to the input signal is shown in the figure by Vnr, and in addition, Cs, Vns, Ci and Vni are equivalent circuits of the interference source; and finally, the third source is multi-ground wire loop interference which may occur depending upon connection of the ground wires. Now, detailed analysis of influence of these interferences is provided.

Induced interference at the wiring between the reference terminal of receiving and transmitting sides is explained as follows.

Vnl shown in FIG. 1 is the interference voltage induced by this interference source. Single ended signal is generally transferred by unbalanced shielded wire. As the reference terminal of the signal is connected by an outer shielded layer of the shielded wire, it will easily generate induced voltage. The interference source may be equivalent to a voltage source with a high internal resistance. This interference voltage can be reduced by reducing impedance of load between its two terminals. The load impedance is impedance between Goe and Gie with the connection wiring of the reference terminal removed, and consisted of two impedances in parallel. One impedance is combination of Rs and Ri in series and the other is combination of Cs and Ci in series. Vnl in the figure is the interference voltage with the load impedance between the two terminals being calculated. In the equivalent circuit shown in FIG. 1, since the signal reference terminal and device ground are the same, and since Cs and Ci are large enough, Vnl is not large and therefore, Vnl has less impact on entire input interference voltage. It should be noted that thickening of the conductor will reduce the internal resistance of the interference source thereof and increase the induced interference signal, hence resulting in increase of Vnl.

The receiving and transmitting terminal employ shielded inner conductor as their connection wiring and accordingly, less interference signal will be induced on the wire. However, in case where the load impedance become large due to large input impedance of the receiving terminal, or where the shielded wire produces less effective shielding function, induced interference influence from connection wiring between the receiving and transmitting terminals will increase.

If the single ended signal is transferred via balanced shielded wire, that is, both the signal terminal and reference terminal use shielded wire incorporating inner conductor therein, the induced interference potential at the connection wiring can be regarded as very small and consequently, less influence will be applied to Vnl.

Next, impedance of the connection wiring at the reference terminal resulted from interference current passing through the connection wiring is explained, wherein the interference current is induced by unbalancing induced voltage between the reference terminal of receiving and transmitting sides.

Cs, Vns, Ci, and Vni shown in FIG. 1 are the equivalent circuit of the interference source. The interference source includes induced interference and interference resulted from power and grounding system. Cs is the totality of body capacitance and induced capacitance of the device ground of transmitting side, Vns is induced voltage interference on the device ground of the transmitting side, Ci is the totality of body capacitance and induced capacitance of the device ground of receiving end, while Vni is induced voltage interference on the device ground of the receiving side. When induced potential difference occurs between Vns and Vni, induced current will be generated, and accordingly, interference voltage Vnr is generated on Rr.

In FIG. 1, as the receiving and transmitting signal reference terminals directly couple with the device grounds, both Cs and Ci are very large and therefore, induced interference voltage will also be very large. In case where the device ground is still coupled to an external ground system, Cs or Ci thereof will still increase. Consequently, interference current flowing through Rr will also be increased if induced potential difference exists between the reference terminals of receiving and the transmitting sides, thus resulting in larger interference voltage.

Multi-ground wire loop interference is explained as follows.

During transmission of single ended signal, there may also be multi-ground wire loop interference. If the devices at both sides are connected by more than one ground wires, a loop circuit will be defined between every two ground wires. Interference potential will be produced in the loop, once varying flux passes through the area defined by the loop. The interference current resulted from the interference potential will generate interference voltage on signal ground wire Rr. In actual applications, this situation may occur frequently. For example, when both the device themselves have its power and are connected with the signal ground wires, one power will be connected with the ground wire in case where the two device are powered by the same power. Further, since another signal ground wire is needed for transmission of the single ended signal, there will accordingly be two ground wires. However, in conventional single ended signal transmission system, the device ground and signal ground are usually connected with each other directly. Once ground wire loop interference occurs, much experience will be required to eliminate the interference and thus, handling of the ground wire will become complicated.

In scheme of the invention, as isolation impedance is disposed in the loop composed of the signal ground and device ground, and since the impedance is sufficiently larger than impedance of the signal ground, ground wire loop interference voltage will mainly apply on the isolation impedance and will have little impact on the signal ground.

SUMMARY OF THE INVENTION

One object of the invention is to provide a method for transferring single ended signal, which holds high interference resistance and results in low cost.

Another object of the invention is to provide an output device for transmission of single ended signal capable of resisting interference, holding high interference resistance and bearing low cost.

The objects of the invention are obtained by the following technical scheme.

A method of transferring single ended signal with interference-resistance is disclosed. The transmission of the single ended signal includes an input device and an output device. The output device has its signal output terminal connected with a signal input terminal of the input device. A signal floating isolation circuit SFS is connected with the signal output terminal of the output device and/or signal input terminal of the input device. The output signal or input signal is output or input via this floating isolation circuit. The isolation reference terminal of the output signal is coupled to ground of the output device through the isolation impedance, and/or the isolation reference terminal of the input signal is coupled to the ground of the input device through the isolation impedance. The signal output reference terminal of the output device and the signal input reference terminal of the input device are connected with each other.

The device ground of the output device may be connected with the device ground of the input device, and lower impedance of connection wiring between the device grounds can enhance interference-resistance performance of the system. In the scheme of the invention, as isolation impedance is disposed in the loop formed by the signal ground and device ground, and the isolation impedance is greater sufficiently than the impedance of the signal ground wire, interference voltage presented on the ground wire loop will mostly act on the isolation impedance, and will have little effect on the signal ground wire. If there are several connection wires used for the device ground, ground wire loop interference will be rendered on the device ground wires. However, the ground wire loop interference presents little effect on the signal ground wire; in other words, signal transmission will not be affected. Therefore, multiple device ground wire connections may be presented in the system and this brings great convenience for actual application. Namely, we can increase number of low impedance connection wirings used for the device ground conveniently without fearing that whether ground wire loop interference will be introduced due to existing device ground connections.

When transmission and receipt of the single ended signal run between several devices, for example, when several input devices receive the same signal, the floating isolation port method of the invention may be used to these devices. That is, one or more signal input terminals or output terminals can connect with the floating isolation circuit SFS so as to sufficiently decrease interference. Preferably, when at most only one device doesn't use the floating isolation port method of the invention, little interference will exist on connection wiring between every two reference terminals.

The output device of the invention used to transfer a single ended signal with interference-resistance comprises floating isolation circuit and isolation impedance. The single ended signal is output through the floating isolation circuit, thereby establishing an isolation reference terminal for the output signal relative to the device ground of the output device used for transmission of the single ended signal with interference-resistance. The isolation reference terminal of the output signal connects to the device ground of the output device by the isolation impedance. In the invention, during interference resistance transmission, the device ground of the output device connects with the device ground of other input device In the invention, an input device for transmitting single ended signal with interference-resistance is provided which comprises floating isolation circuit and isolation impedance. The single ended signal is input through the floating isolation circuit, thereby establishing an isolation reference terminal for the input signal relative to the device ground of the input device used for transmission of the single ended signal with interference-resistance. The isolation reference terminal of the input signal connects to the device ground of the input device by the isolation impedance. In the invention, during interference resistance transmission, the device ground of the input device connects with the device ground of other output device.

By improving interface circuit design between signal receiving and transmitting ends, interference signals entered into the signal channels are clearly reduced, thereby achieving transmission of single ended signal with interference-resistance.

The invention is described in greater detail below in conjunction with drawings and embodiments thereof.

DETAILED DESCRIPTION OF THE INVENTION

Figure 1:
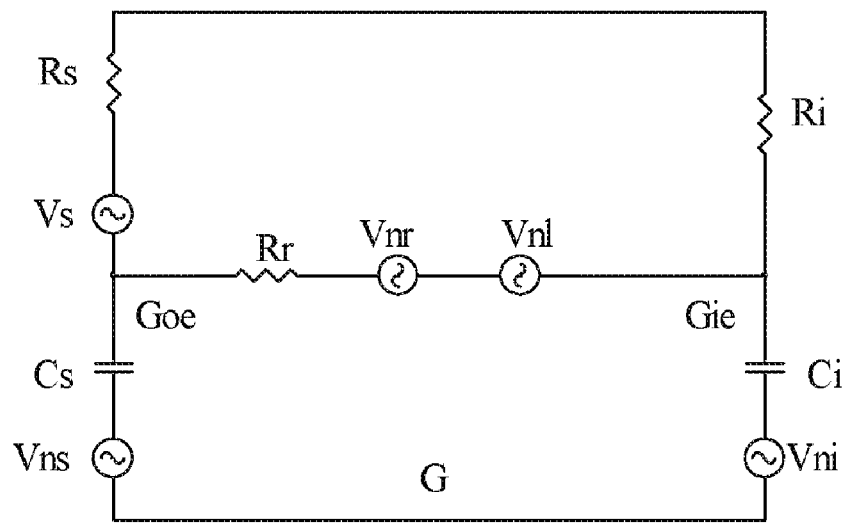
FIG. 1 shows an equivalent circuit of single ended signal transmission interference.

Reference is made to the equivalent circuit of single ended signal transmission interference shown in FIG. 1 and to the following reference numerals.

G: reference ground
Goe: signal output device ground
Gos: isolation reference terminal of the output signal of the signal output device
Gie: signal input device ground
Gis: isolation reference terminal of the input signal of the signal input device
Vs: voltage source of output signal
Rs: internal output resistance of signal side
Ri: internal input resistance of signal side
Ros: isolation impedance between the Goe and Gos at signal output side
Ris: isolation impedance between Gie and Gir at signal input side
Cs: the sum of body capacitance and capacitance of induced capacitor of the signal output device ground relative to the reference ground G
Vns: induced interference voltage of the signal output device ground relative to the reference ground G
Ci: the sum of body capacitance and capacitance of induced capacitor of the signal input device ground relative to the reference ground G
Vni: induced interference voltage of the signal input device ground relative to the reference ground G
Rr: impedance of connection wiring between the signal input reference terminal and output reference terminal
Vnl: induced interference voltage at the wiring between the signal input reference terminal and output reference terminal
Vnr: interference voltage resulted from interference current generated at Rr by all the interference source existing in a system
Vn: the sum of Vnl and Vnr, i.e., equivalent interference voltage on the signal input
Rg: impedance of the wiring between the signal input device ground and signal output device ground.
SFS: signal floating isolation circuit, wherein The SFS signal floating isolation circuit is a functional unit circuit having four ports represented in the description as A, B, C and D. Ports A and B are input ports, while ports C and D are output ports. The circuit enables the input signal and output signal to turn into a floating status with respect to each other, that is, reference terminal potential of the input signal has no relation with the reference terminal of the output signal, but varies following outer condition. In other words, both the input signal and output signal can build their own reference terminals potential with respect to each other. Isolation transformer and optoelectronic coupled device are typical devices which provide this function. Differential input amplification circuit constructed by operational amplifier can also provide this function and gain good linearity. For differential input amplification circuit built by operational amplifier, this is an application in which input impedance is unbalanced. Making input impedance of the amplification circuit higher enough than inner resistance of the input signal can improve ability of resisting common mode interference and therefore, utilization of operational amplification circuit is a cost effective solution.

In the equivalent circuit of single ended signal transmission shown in FIG. 1, it is necessary to reduce both Vns and Vni at the same time or make them consistent with each other so as to reduce induced potential difference. As Rr is smaller substantially than Rs and Ri in series, induced current formed between Goe and Gie mostly flows through Rr. The induced current flows a loop defined by Cs, Ci and Rr. It is possible to increase impedance of the loop by reducing Cs, Ci or the both. This can reduce the induced current in the loop. While reduce Cs and Ci, Vns and Vni will reduce as well, even low induced current in the loop will be.

Generally, body capacitance and induced capacitance of both the receiving signal terminals and transmitting signal terminals are very small, and induced voltage thereof maintains low and loop impedance thereof are kept high. These two factors cause decreasing of interference current in the loop and as a result, there gets no influence for unbalanced inductance between the receiving and transmitting terminals. As for induced interference between the receiving and transmitting signal terminals, they can be reduced by utilization of shielded wire with good shielding effect and proper selection of impedance of the input terminals.

From the above analysis, it is apparent that interference in a single ended signal transmission system mainly comes from induced interference of receiving and transmitting reference terminals and connection wiring there between, while interference introduced by the receiving and transmitting signal terminals and connection wiring is small. Interference coming from connection wiring between the receiving and transmitting reference terminals is related to the device ground and capacitance thereof. It is necessary lowering the interference voltage at both the receiving and transmitting sides to reduce interference by decreasing unbalanced induced voltage. The interference caused by unbalanced induced voltage may be reduced by reducing Rr of the reference terminal connection wiring, and the interference caused by unbalanced induced voltage may also be lowered by reducing capacitance of either reference terminal of the receiving side and transmitting side.

Following is detailed embodiments of the invention of method for transmitting single ended signal with interference-resistance.

Embodiment 1

Figure 2:
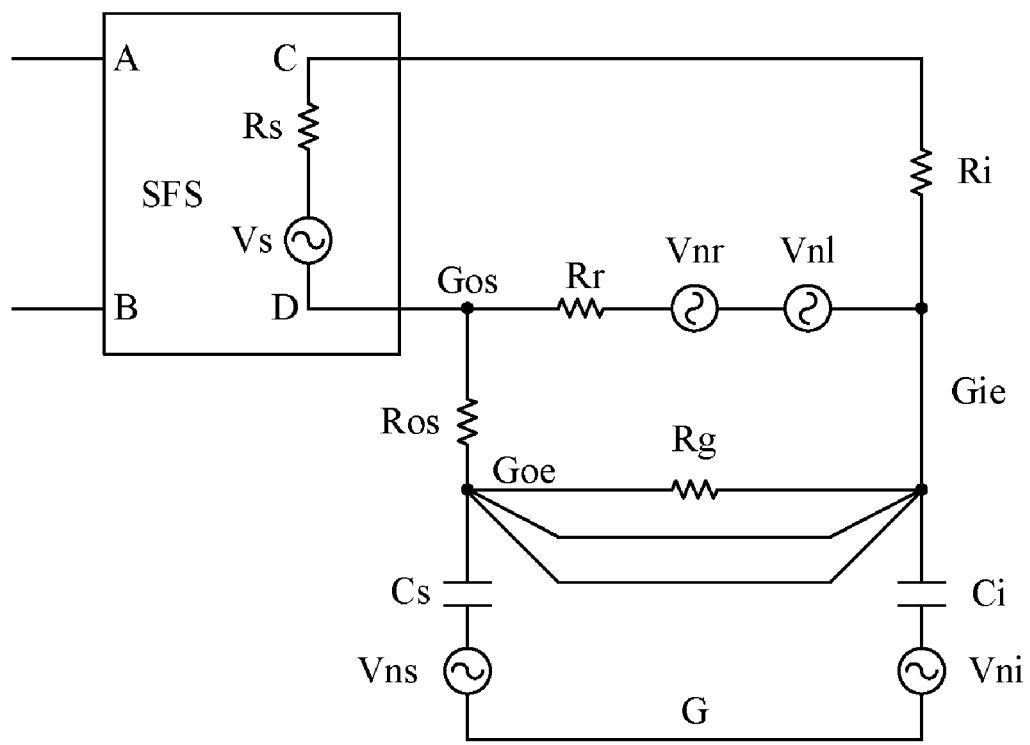
FIG. 2 shows an equivalent circuit of single ended signal transmission interference at floating isolated output terminal according to an embodiment of the invention.

Referring to FIG. 2, there is shown a method for transmitting single ended signal in which output side is isolated floatingly. Compared to the equivalent circuit shown in FIG. 1, the circuit shown in FIG. 2 has modified circuit construction at its signal output side. This modification is made such as the output signal is output through a floating isolation circuit SFS, thereby establishing an isolation reference terminal for the output signal relative to the device ground of the output capable of transferring single ended signal with interference-resistance. The isolation reference terminal Gos of the output signal is connected with the output device ground Goe by isolation impedance Ros. In addition, a connection wire for connecting the device ground of the receiving and transmitting sides is added and has an impedance of Rg. Only an additional connection wire is provided for the signal input side for connecting the device ground of both the receiving and transmitting sides. If both the receiving and transmitting sides have been connected to the same ground by power cable, dedicated connection wire may be omitted here from. Because the isolation reference terminal Gos is not connected with the device ground directly, the body capacitance and induced capacitance may be very small. Rg is impedance of the connection wire that connects the two device grounds, and may have the same value as Rr. The value of Ros should be determined as follows:

$$Ros \gg Rr \text{ and } Ros \gg Rg$$

Induced interference of the connection wire between the receiving and transmitting reference terminals is explained below.

In situation where induced interference potential on the transmission wires is large, this may happen when single ended signal is transferred via unbalanced shielded wire or over a long transmission distance, impedance between Gos and Gie should be lowered. This impedance is constructed by three impedance in parallel. The three impedance are Rs connected with Ri in series, Cs connected with Ci in series and Ros connected with Rg also in series. Ros is a major factor that has great effect on the impedance. The larger Ros is, the bigger the equivalent voltage Vnl is. In most application systems, Ros less than 1000 ohm is enough to eliminate the interference on the connection wire to a substantial extent.

In case where induced potential on the connection wiring of the reference terminal is low, this may happen when single ended signal is transferred across balanced shielded wire and both the signal terminal and reference terminal use shielded inner conductor, or when transmission distance is short, isolation impedance Ros between Gos and Gie may be high. or infinitely high, whereas the influence of interference Vnl may still not be big.

Another situation is explained, in which interference current flows through impedance Rr of the connection wiring at the reference terminal, the interference current being caused by unbalanced induced voltage between the receiving and transmitting sides.

As body capacitance and induced capacitance of Gos are very low, interference current caused by unbalanced induced voltage between Gos and Gie is also low; and therefore, the equivalent interference source of this interference is not presented in the equivalent circuit shown in FIG. 2.

The interference source caused by unbalanced voltage between Goe and Gie is the same with that shown in FIG. 1. Due to presence of Ros, interference current passing through Rr becomes reduced largely, and large portion thereof passes through Rg. Smaller value of Rg and bigger value of Ros can reduce the interference current passing through Rr and Vnr also can be small. When Rg equals Rr, ratio of current passing through Rr and Rg respectively equals ratio of Rg and Ros. Because Rg is resistor of the connection wire, impedance thereof can be regarded as less than 1 ohm. When Ros has a value of 100 ohm, interference current passing through Rr is 100 times smaller than that passing through Rg and accordingly, when compared to the equivalent circuit illustrated in FIG. 1, Vnl will also be 100 times smaller than its original value. It is thus known that Vnr can be reduced effectively due to presence of Rg and Ros.

The totality of Vnl and Vnr is equivalent interference voltage at the signal input end. In the equivalent circuit shown in FIG. 2, Vnl increases with the increasing of Ros, Vnr increases with the decreasing of Ros and decreases with decreasing of Rg and Rr. Suitable selection of Ros with the aim of minimizing the sum of Vnl and Vnr can optimize capability of the signal transmission system in interference resistance. In case where induced potential on the connection wire of the reference terminal is high, this may happen when the single ended signal is transmitted across unbalanced shielded wire or over a long transmission distance, the impedance of Ros should be lower so as to reduce Vnl. In case where induced potential on the connection wire of the reference terminal is low, this may happen when the single ended signal is directed by balanced shielded wire and both the reference terminal and signal terminal use inner conductor in the shielded wire as their connection wires or when transmission distance is short, the impedance of Ros can be larger. In this situation, Ros can be large or infinitely large, and Vnl may be still not too large, so Vnr can be small. In determining the value of Ros, another factor should be considered. That is, larger value of Ros will result in smaller ground loop interference caused by multi ground connections.

If the connection wiring between the signal input device ground and signal output device ground is not connected, this will mean that value of Rg is infinitely large, thus having no impact on transmission of signal. However, this results in worse interference-resistance performance of the transmission system. Especially great common mode interference will be generated at the input if Ros is large enough.

If there are several connection wires which connect the signal input device ground and the signal output device ground, wire loop interference will arise at the device ground wire. This wire loop interference in device ground has little influence on signal ground wire, that is, it will not interfere with transmission of the signal. Accordingly, there may be multiple device ground wires being connected.

Embodiment 2

Figure 3:
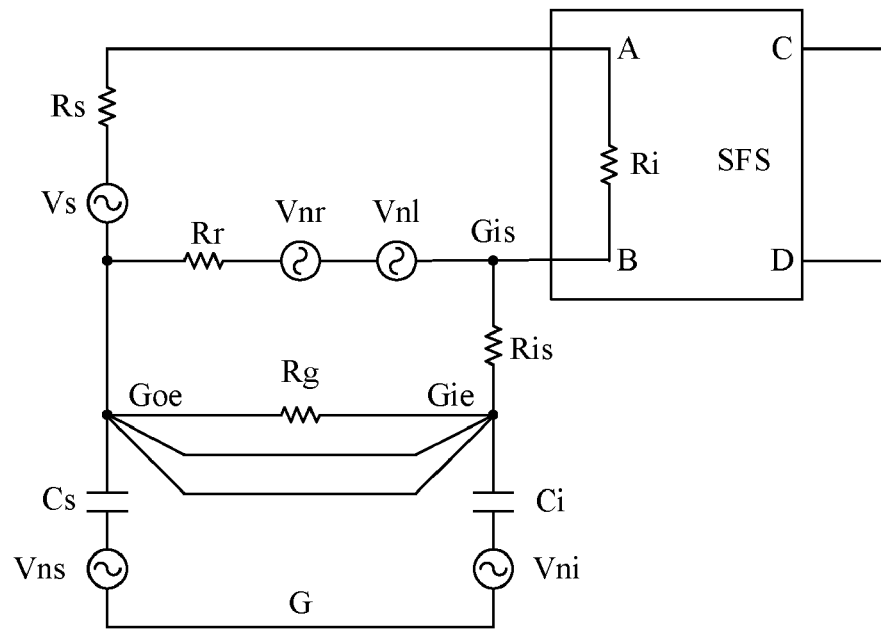
FIG. 3 shows an equivalent circuit of single ended signal transmission interference at floating isolated input terminal according to another embodiment of the invention.

Referring to FIG. 3, there has been shown a method of transferring single ended signal with input side being floatingly isolated. Compared to the equivalent circuit shown in FIG. 1, the circuit shown in FIG. 3 has modified circuit construction at its signal input side. This modification is made such that the input signal is input through a floating isolation circuit SFS, thereby establishing an isolation reference terminal for the input signal relative to the device ground of the input side capable of transferring single ended signal with interference-resistance. The isolation reference terminal Gis of the input signal is connected with the device ground Gie of the input device by isolation impedance Ris. In addition, a connection wire for connecting the device ground of the receiving and transmitting sides is added and has an impedance of Rg. Only an additional connection wire is provided for the signal output side for connecting the device ground of both the receiving and transmitting sides. If both the receiving and transmitting devices have been connected to the same ground by power cable, this dedicated connection wire may be omitted. Because the isolation reference terminal Gis is not connected with the device ground directly, the body capacitance and induced capacitance may be very small. Rg is impedance of the connection wire that connects the two device grounds, and may have the same value as Rr. The value of Ris should be determined same as that of Ros shown in FIG. 2.

It is known from what has been described above that embodiment 2 differs from embodiment 1 only in that it applies similar circuit modification on the receiving side or transmitting side respectively. The analysis of anti-interference of embodiment 2 and corresponding result there from are similar to those of embodiment 1.

Embodiment 3

Figure 4:
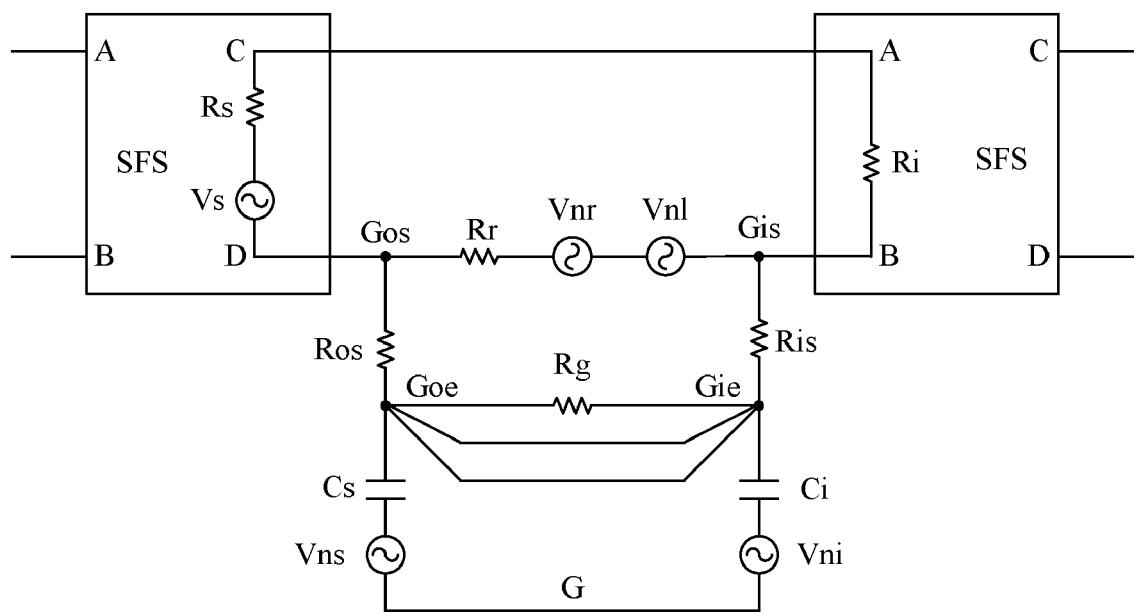
FIG. 4 shows an equivalent circuit of single ended signal transmission interference at floating isolated output and input terminals according to yet another embodiment of the invention.

Referring to FIG. 4, there is shown a method for transmitting single ended signal with both input and output ends being isolated floatingly. The equivalent circuit thereof is the combination of that shown in FIG. 2 and that shown in FIG. 3. In this circuit, both the signal input side and output side employ floating isolation circuit SFS and corresponding isolation impedance Ros and Ris. Because both the input reference terminal and output reference terminal are of isolation reference terminal, induced interference between the reference terminals can be further reduced, and this interference accounts for little portion of the entire interference. In calculation of unbalanced induced voltage interference between the receiving end and transmitting end, Ros or Ris may be replaced by Ros plus Ris. It is found from above overall analysis that the equivalent circuit of FIG. 4 produces same anti-interference effect as the equivalent circuit shown in FIG. 2 or FIG. 3.

It can be obtained from conclusions of embodiments 1, 2 and 3 that the same interference resistance effect for the single ended signal transmission system can be attained by using method of floatingly isolating port of the invention either at signal input device or at signal output device.

When receipt and transmission of the single ended signal occurs among multiple devices, for example when several input devices receive the same signal, the floating isolation port method of the invention may be used to these devices. That is, one or more signal input terminals or output terminals can connect with the floating isolation circuit SFS so as to sufficiently decrease interference. Preferably, when at most only one device doesn't use the floating isolation port method of the invention, little interference will exist on connection wiring between every two reference terminals.

Compared to conventional single ended signal transmitting method, the invention can greatly improve anti-interference performance during transmission of single ended signal. The implementation of the invention needs lower cost and can realize objects only by applies the invention on either device at receiving end or transmitting end. In addition, no problem of compatible with conventional device arises and thereby, the invention may be easily implemented.

What is claimed is:

1. A method of transferring a single ended signal with interference-resistance, in which transmission of the single ended signal comprises an output device and an input device, the output device having its signal output terminal connected with a signal input terminal of the input device, wherein a floating isolation circuit is connected with the signal output terminal of the output device and/or the signal input terminal of the input device; an output signal or an input signal is output or input respectively via the floating isolation circuit; an signal output isolation reference terminal output device is coupled to device ground of the output device through an output isolation impedance, and/or an signal output isolation reference terminal input device is coupled to device ground of the input device through an input isolation impedance; and the signal output isolation reference terminal of the output device and the signal input isolation reference terminal of the input device are connected with each other, wherein the device ground of the output device is connected with the device ground of the input device, and the device ground of the output device and the device ground of the input device are connected with each other by several connection wires.

2. An output device used to transfer a single ended signal with interference-resistance, comprising a floating isolation circuit and an isolation impedance, wherein the single ended signal is output through the floating isolation circuit, thereby the floating isolation circuit can establish for an output signal an isolation reference terminal referenced by the output signal relative to a device ground of the output device used to transfer the single ended signal with interference-resistance, and wherein the isolation reference terminal connects to the device ground of the output device by the isolation impedance, wherein the device ground of the output device connects with a device ground of an input device during interference-resistance transmission, and the device ground of the output device connects with the device ground of the input device by several connection wires.

3. The output device used to transfer the single ended signal with interference-resistance according to claim 2, wherein the value of the isolation impedance is infinitely large.

4. An input device used to transfer a single ended signal with interference-resistance, comprising a floating isolation circuit and an isolation impedance, wherein the single ended signal is input through the floating isolation circuit, thereby the floating isolation circuit can establish for an input signal an isolation reference terminal referenced by the input signal relative to a device ground of the input device used to transfer the single ended signal with interference-resistance, and wherein the isolation reference terminal connects to the device ground of the input device by the isolation impedance, wherein the device ground of the input device connects with a device ground of an output device during interference-resistance transmission and the device ground of the input device connects with the device ground of the output device by several connection wires.

5. The output device used to transfer the single ended signal with interference-resistance according to claim 4, wherein the value of the isolation impedance is infinitely large.

* * * * *